H. M. WYETH.
LINGERIE STRAP RETAINER.
APPLICATION FILED OCT. 21, 1920.

1,401,227.  Patented Dec. 27, 1921.

Inventor—
Henrietta M. Wyeth.
by- her Attorneys.
Howson & Howson

UNITED STATES PATENT OFFICE.

HENRIETTA M. WYETH, OF SOUTH HANSON, MASSACHUSETTS.

LINGERIE-STRAP RETAINER.

1,401,227.     Specification of Letters Patent.    Patented Dec. 27, 1921.

Application filed October 21, 1920. Serial No. 418,412.

*To all whom it may concern:*

Be it known that I, HENRIETTA M. WYETH, a citizen of the United States, residing in South Hanson, Massachusetts, have invented certain Improvements in Lingerie-Strap Retainers, of which the following is a specification.

One object of my invention is to provide a retainer for preventing shoulder straps slipping off of the shoulders.

A further object of the invention is to provide an elastic retainer, which can be readily applied to the shoulder straps and which will encircle, and firmly hold, one or more straps.

Figure 1:
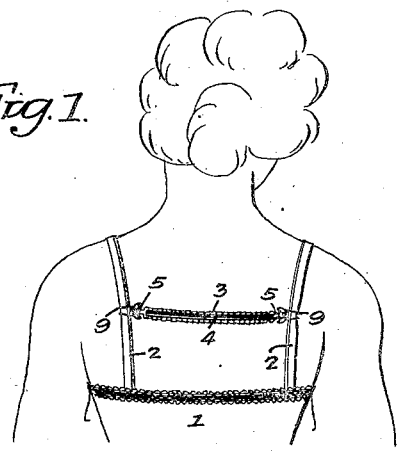
Figure 1 is a view of the back of a person, showing my improved retainer in position.
Figure 2:
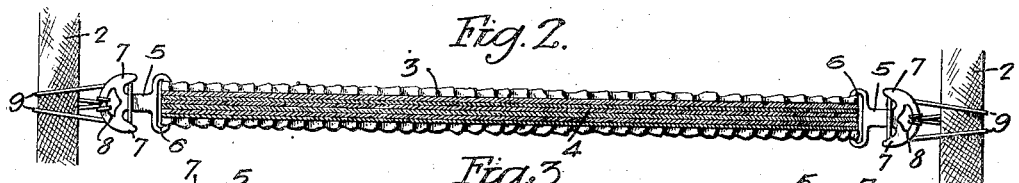
Fig. 2 is an enlarged view of the retainer illustrated in Fig. 1, showing one method of fastening the retainer to the shoulder straps.
Figure 3:
Fig. 3 is a view, slightly enlarged, showing the retainer detached from the shoulder straps.

Referring to the drawings, 1 is an undergarment having straps 2, which extend over the shoulder of the wearer. These straps often fall off of the shoulder of the wearer, causing much annoyance. In order to retain the shoulder straps in proper position, I provide a retainer 3, having a portion 4, preferably of elastic material, and having celluloid, or other non-metallic fasteners 5 at each end. These fasteners, as shown in Figs. 2 and 3, have an elongated eye 6 through which the fabric 4 of the retainer is passed and secured by a row of stitches. At the end of this fastener 5 are hooks 7. The fastener is slotted at 8. A rubber band 9 is passed through this slot 8 and one end of the rubber band is passed through the other end, as shown in Fig. 3, so as to attach the rubber band firmly to the material.

When the retainer is applied to a garment, the rubber band 9 is passed around the shoulder strap 2, and around hooks 7, as shown in Fig. 2, holding the retainer firmly to the strap.

Figure 5:
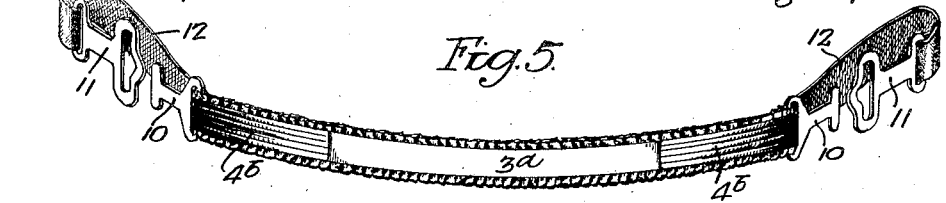
Figs. 5, 6 and 7 are views of other modifications of the invention.

While the portion 4 is illustrated as made of an elastic web throughout, it may be made, as shown in Fig. 5, with a non-elastic center $3^a$ and elastic ends $4^b$, or it may be made of ribbon, or other suitable material.

Figure 4:
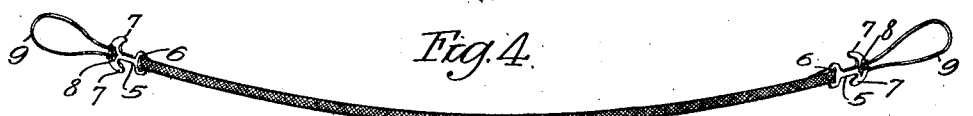
Fig. 4 illustrates a modification, in which a single, narrow elastic cord is used instead of the strap.

In Figs. 2 and 3, the section 4 of the retainer is illustrated as comparatively wide. In Fig. 4, a single strand of rubber is illustrated, inclosed within a casing $4^a$, and the fastening devices are comparatively small.

In Fig. 5 a different form of fastener is shown, dispensing with the elastic band. The fastener, in this instance, is made in two parts. The T-headed part 10 is secured to the elastic section $4^b$ and a slotted part, 11, which is adapted to receive the T-head of the part 10, is secured to the strap 12, which encircles the shoulder strap.

Figure 6:

In Fig. 6, another modification is shown, in which the fastening section $4^c$ has a snap button 13 adapted to a socket 14 in an extension $12^a$, which encircles the shoulder strap.

Figure 7:
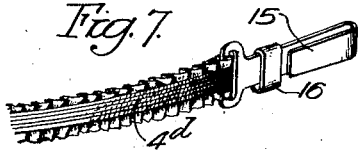

In Fig. 7, a spring fastener 15 is shown made of celluloid, or metal, which is attached to an elastic portion $4^d$ of the retainer. This fastener is shaped to clamp the fabric of the shoulder strap, preventing the retainer slipping longitudinally on the shoulders, and a slide 16 is preferably used to hold the spring member to the strap.

While I have illustrated several means of fastening the retainer, other means will readily suggest themselves without departing from the essential features of the invention.

When there are several shoulder straps to be held in position, the retainer will engage all the straps.

A retainer made in accordance with my invention can be easily applied to shoulder straps when the garment is on the wearer, the retainer holding the straps in such position as to afford comfort to the wearer and eliminating entirely the unsightly appearance evidenced when shoulder straps are not in their normal position.

I claim:

1. A detachable retainer adapted to be applied to shoulder straps of lingerie to hold them in position, said retainer consisting of an elastic body portion extending from one strap to the other; and non-metallic fastening devices attached to the elastic body portion, said devices being arranged to encircle the shoulder straps.

2. The combination in a retainer for holding shoulder straps of lingerie in position, of a body portion extending from one shoulder strap to the other; hooked fastening devices attached to the body portion; and an elastic band secured to each fastening device and arranged to pass around a shoulder strap and around the hooked portions of the fastening device.

HENRIETTA M. WYETH.